United States Patent
Ala-Luukko (10) Patent No.: US 7,133,393 B2
(45) Date of Patent: Nov. 7, 2006

(54) PREPAID SERVICE IN A PACKET-SWITCHED MOBILE COMMUNICATION NETWORK

(76) Inventor: Sami Ala-Luukko, Gyldeninrie 7 A 9, Helsinki (FI) FIN-00200

( * ) Notice: Subject to any disclaimer, the term of this patent is extended or adjusted under 35 U.S.C. 154(b) by 510 days.

(21) Appl. No.: 10/361,289

(22) Filed: Feb. 10, 2003

(65) Prior Publication Data

US 2003/0147363 A1    Aug. 7, 2003

Related U.S. Application Data (63) Continuation of application No. PCT/FI01/00716, filed on Aug. 14, 2001.

(30) Foreign Application Priority Data

Aug. 14, 2000    (FI) .................................. 20001788

(51) Int. Cl.
*H04Q 7/24* (2006.01)

(52) U.S. Cl. ........................ 370/338; 370/349; 370/352; 379/114.2; 379/114.01

(58) Field of Classification Search ................ 370/351, 370/352, 384, 345.1, 480, 229–234, 241, 370/252, 254, 465, 401, 338, 349, 353–356; 379/114.2, 114.01; 455/406
See application file for complete search history.

(56) References Cited

U.S. PATENT DOCUMENTS 5,854,975 A * 12/1998 Fougnies et al. ............ 455/408
5,974,048 A * 10/1999 Godse et al. ................ 370/396
5,978,376 A * 11/1999 Godse et al. ................ 370/396
6,496,690 B1 * 12/2002 Cobo et al. .................. 455/408

FOREIGN PATENT DOCUMENTS

| WO | WO 99/16262 | 4/1999 |
| WO | WO 99/16281 | 4/1999 |
| WO | WO 00/24161 | 4/2000 |
| WO | WO 00/69118 | 11/2000 |

* cited by examiner

*Primary Examiner*—Ajit Patel
(74) *Attorney, Agent, or Firm*—Berkeley Law & Technology Group (57) ABSTRACT

A method and system for implementing a prepaid service in a packet-switched mobile communication network, in which information requested by a mobile station is delivered to the mobile station so long as the subscriber has maintained a sufficient prepaid balance from which the service charges can be deducted. An access point name definition, which points to a service node via which access to or use of an associated prepaid service is provided, is defined. A control server is used to monitor the service traffic between the mobile station and the content server after the access point name definition identified in an activation request for data service has been sent from the mobile station. Traffic monitoring continues as long as the data service is active, and the prepaid service balance in a billing database is dynamically updated to reflect the subscriber's ongoing use of the data service based on the continued monitoring of the control server.

43 Claims, 6 Drawing Sheets

PREPAID SERVICE IN A PACKET-SWITCHED MOBILE COMMUNICATION NETWORK

CROSS-REFERENCE TO RELATED APPLICATION

This is a continuation of International Application No. PCT/FI01/00716, filed Aug. 14, 2001.

BACKGROUND OF THE INVENTION

1. Field of the Invention

The present invention relates to telecommunication systems and, in particular, to a system in which client access to a prepaid service—i.e. a network-deliverable service which is accessible to a client that has previously deposited currency sufficient to cover the charges for subsequent use of the service into an account of the service provider—is implemented in a general packet radio service (GPRS) system or network.

2. Description of Related Art

The widespread use and popularity of the global system for mobile communication (GSM) has resulted in the development of increasing numbers of new systems for use in digital communications. The central components of the GSM network are the mobile station of a client or network subscriber, the station being identified in the network by means of a subscriber identity module, and the base station, which establishes a radio-based telecommunication connection with the mobile station and determines the cell area within which the mobile station can move without requiring a handover to another cell base station. Such telecommunication network systems are formed of a multiplicity of cell areas. Roaming of a mobile station denotes that the mobile station is visiting or is otherwise located within the area of a telecommunication system of another operator. The subscriber information for a mobile communication system is stored in the home location register (HLR) of that system. It is anticipated that, in the future, the GSM system may perhaps be modified or redeveloped into a universal mobile telecommunications system (UMTS).

In a general packet radio service (GPRS), which has been standardized by the European Telecommunications Standards Institute (ETSI), information is transferred in the form of digital packets. A packet-switched radio service enables the flexible transfer of information to end users using packet-switched protocols, such for example as the Internet Protocol (IP) and X.25 protocol, and is commonly used to transfer information with notable efficiency because the user can define between one and eight time slots for the particular data transfer.

To implement packet-switched radio service in the global system for mobile communication, two new network nodes, among other things, are needed. A serving GPRS support node (SGSN) monitors the locations of individual mobile stations and implements security operations and access control. A gateway GPRS support node (GGSN) connected to the serving GPRS support node implements the telecommunication connection to external packet-switched telecommunication networks. Also required is the registration information for the subscribers belonging to the access network in the home location register.

Development of the so-called wireless application protocol (WAP) now permits Internet services to be brought into wireless mobile stations. The WAP protocol enables the connection setup from a mobile station to the Internet to be defined so as to allow access to a World Wide Web browser program, an e-mail program and other Internet applications using the mobile station. Other so-called micro-browser programs, such for example as Imode over GPRS and Compact HTML over GPRS, have also been developed.

Currently known is the so-called Customized Applications for Mobile network Enhanced (CAMEL), with which a network operator can implement services accessible to a subscriber of the network who is visiting a telecommunication network of another operator. CAMEL has for example been presented in the standard TS 22.078 V.3.2.0 (1999-12) of the $3^{rd}$ generation partnership project (3GPP).

It is also known to implement services in telecommunication networks by means of so-called intelligent networks. An intelligent network (IN) is a telephone network system in which the logic needed to implement services has been placed in a separate unit. Since that unit need not necessarily be located in the telephone exchange, it is possible to advantageously add and develop new services without having to re-plan or reconstruct the central equipment of the network. Such a system typically comprises several nodes, one of which is the service control point (SCP).

A typical service provided in an intelligent network is a prepaid service, in which the subscriber first deposits a certain amount of currency into the account of the service provider and is then able to thereafter use the service. The subscriber is charged for each use of the service by deducting the current charges from the currency already in the account. If no or insufficient currency remains in the account of the subscriber, then the subscriber cannot use the service; only when the subscriber has deposited additional currency into the account, as via a telephone number against which charges may be assessed, can the subscriber then re-call or reaccess the service. Often, the billing criteria by which currency amounts are debited from the subscriber's account is based on time or on the amount of information transferred.

Credits may also be used in lieu of debiting an existing account into which currency has previously been deposited. In the use of credits, the subscriber purchases from the operator connection time on credit, with respect to which a set of credits and an entry in the database of the service provider are stored. The value of one credit may be, for example, one minute of connection time. When the client utilizes the service, the appropriate number of credits stored in the database are deducted in accordance with a predetermined debiting criterion.

Implementation of a prepaid service in a packet-switched radio service network, however, remains a problem. Implementation of a service requires the use of circuit-switched components in a packet-switched radio service network, which is both costly and cumbersome.

It is known to implement a debiting service in a mobile communication network by enhancement of customized applications (CAMEL). This requires that the interface of the intelligent network, which is able to communicate with the service control point (SCP) of the intelligent network, be added to the serving GPRS support node. Such an arrangement is, however, complicated as compared to the transmission of messages in accordance with the present invention, and expressly requires the addition to the network of another and essential component. At present, not a single device manufacturer has provided implementations of a first phase packet-switched radio service network that supports the CAMEL solution. Furthermore, in mobile station roaming CAMEL would require that the serving GPRS support node (SGSN) of each operator that is part of the mobile station roaming contract must support the particular CAMEL functionality in question. For the time being, this seems unlikely to be or become the case in the near future.

Figure 1:
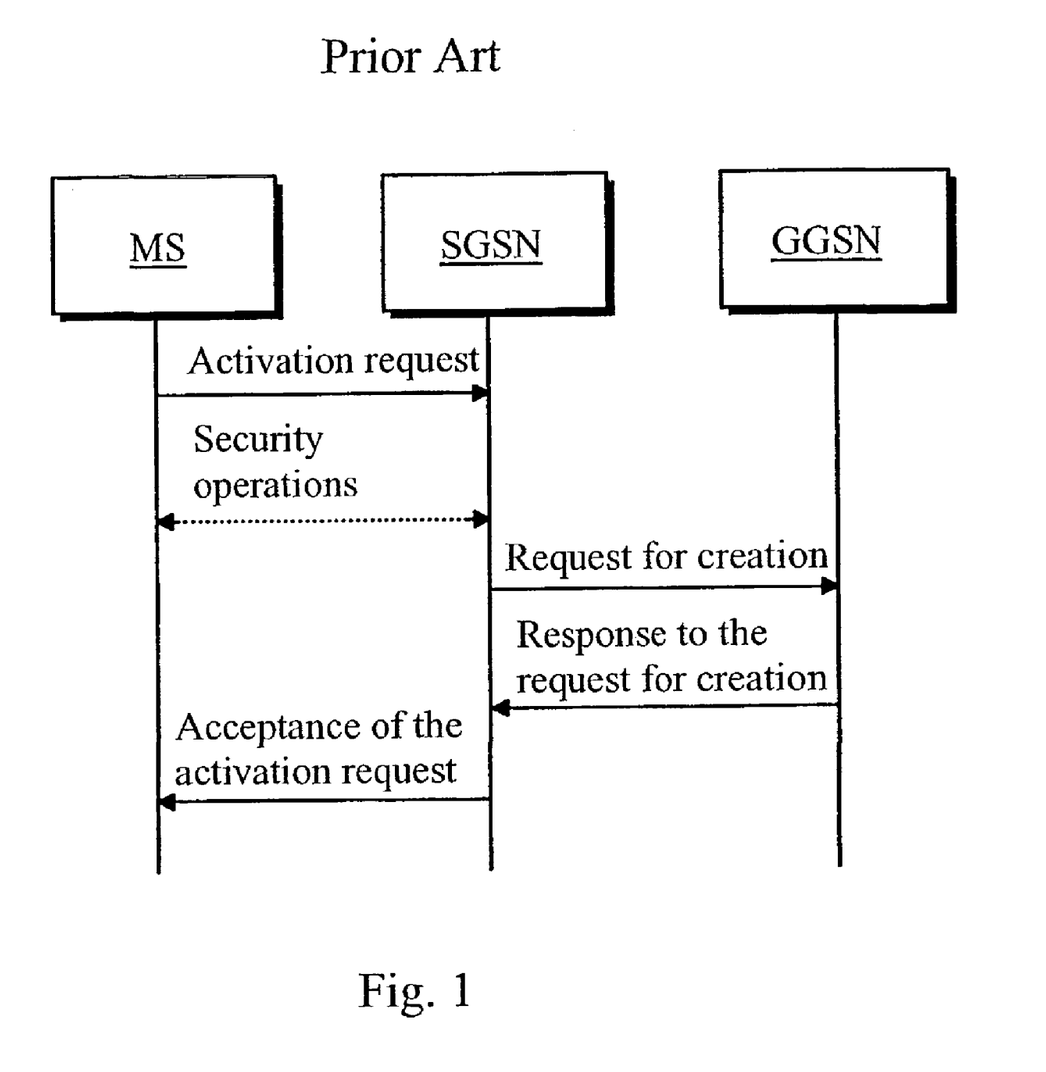
FIG. 1 is a signaling diagram illustrating prior art transmission of messages between components of a telecommunication network.

FIG. 1 depicts an illustrative prior-art signaling diagram which depicts the transmission of messages between the components of a telecommunication network MCN. The components shown in FIG. 1 are a mobile station MS, a serving GPRS support node SGSN, and a gateway GPRS support node GGSN. Mobile station MS first sends a request for service activation to the serving GPRS support node SGSN, which through security operations checks the authenticity of the information of mobile station MS. Next, a request for telecommunication connection setup is sent from the serving GPRS support node SGSN to the gateway GPRS support node GGSN. When the telecommunication connection has been set up, a message so indicating is sent to the serving GPRS support node SGSN, from which a response is further transmitted to mobile station MS.

OBJECTS AND SUMMARY OF THE INVENTION

It is accordingly the desideratum of the present invention to eliminate or at least significantly alleviate the problems and deficiencies of prior art systems and method, as for example those discussed above.

It is a particular object of the invention to provide a considerably simplified system and method of implementing a prepaid service in a general packet radio system.

The present invention enables ready implementation of a billing system for a digital service through monitoring of the telecommunication connection between the mobile station and the content server which provides or supports the service. Information concerning use of the service is gathered on a control server located in the telecommunication network and from which the information is further transferred to the billing database.

The invention further provides a method through which the prepaid service is implemented in a packet-switched mobile network. Information requested by a mobile station is delivered to the mobile station, in accordance with the service, so long as a sufficient prepaid balance remains in the database. An access point name definition that points to the service node via which the prepaid service is used or accessed is first defined. Traffic between the mobile station and the content server is monitored by the control server after the access point definition identified in the activation request for the data service is sent from the mobile station. Traffic monitoring continues for so long as the data service is active. The prepaid service balance stored in the billing database is dynamically updated for each use of the data service as identified through the monitoring of traffic by the control server.

In one embodiment of the invention, the access point definition is placed in the home location register. In another embodiment, prior to the monitoring of traffic between the mobile station and content server the remaining available balance for use of the prepaid service is checked in the billing database, and use of the prepaid service is barred if the prepaid balance in the billing database is insufficient for use of the service. The remaining balance for use of the prepaid service may also or alternatively be checked in the billing database during the monitoring of traffic between the mobile station and content server, and use of the prepaid service is barred if the balance in the billing database is not or is no longer sufficient for use of the service.

In various embodiments of the invention, use of a prepaid service is barred or prevented by stopping the transmission of packets to be sent to the mobile station. Use of a prepaid service may also be barred by sending a message to the gateway GPRS support node.

The billing database may be updated by attributing the follow-up information based on the subscriber number MSISDN, or by attributing the follow-up information based on the subscriber number IMSI.

In some forms of the invention the wireless protocol may be used as the protocol of the gateway. Billing is typically based on real-time charges that are debited on either a per transaction or unit-of-time basis. Billing may alternatively be based on the amount of information transferred.

The database may be placed on the control server, and will typically be located in the SDP node of the intelligent network or the internal database of the prepaid service node. The different definitions of the subscriber, such as the access point definition, are defined in the home location register. Other information relating to the subscriber may also be stored in the database.

A set of components for a mobile communication system are required to implement a prepaid service in accordance with the invention. There must first of course be a mobile communication network to which at least one mobile station is connected. A service node connected to the mobile communication network establishes a connection between the service and the network. In one advantageous embodiment of the invention, the service node comprises a gateway GPRS support node and a serving GPRS support node. A control server for monitoring of traffic is connected to the service node. Billing information is stored in a database attached to the control server.

A system for implementing a service in accordance with the invention comprises an access point attribute, a control unit and an update unit. The access point attribute points to the service node via which the prepaid service is accessible. The control unit monitors data communication between the mobile station and the prepaid service server or provider, and checks the prepaid balance of the mobile station in the billing database. The update unit updates the prepaid balance of the mobile station in the database based on use of the data service from the mobile station.

In an embodiment of the invention, the system further includes barring facilities for preventing use of the prepaid service by the mobile station if insufficient prepaid funds remain in the account for use of the prepaid service.

It is contemplated that the mobile communication network will generally comprise a packet-switched radio service, although implementations of the invention using the global system for mobile communication are also within the intended scope of the invention.

The control server may in some embodiments be integrated with the gateway GPRS support node.

The present invention accordingly enables implementation of a prepaid service in a packet-switched mobile network by adding only a small number of components to the existing telecommunication network. The inventive system also accommodates mobile station roaming without requiring any specific functionality of the serving GPRS support node of the roaming network.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the various Figures.

DETAILED DESCRIPTION OF THE CURRENTLY PREFERRED EMBODIMENTS

Figure 2:
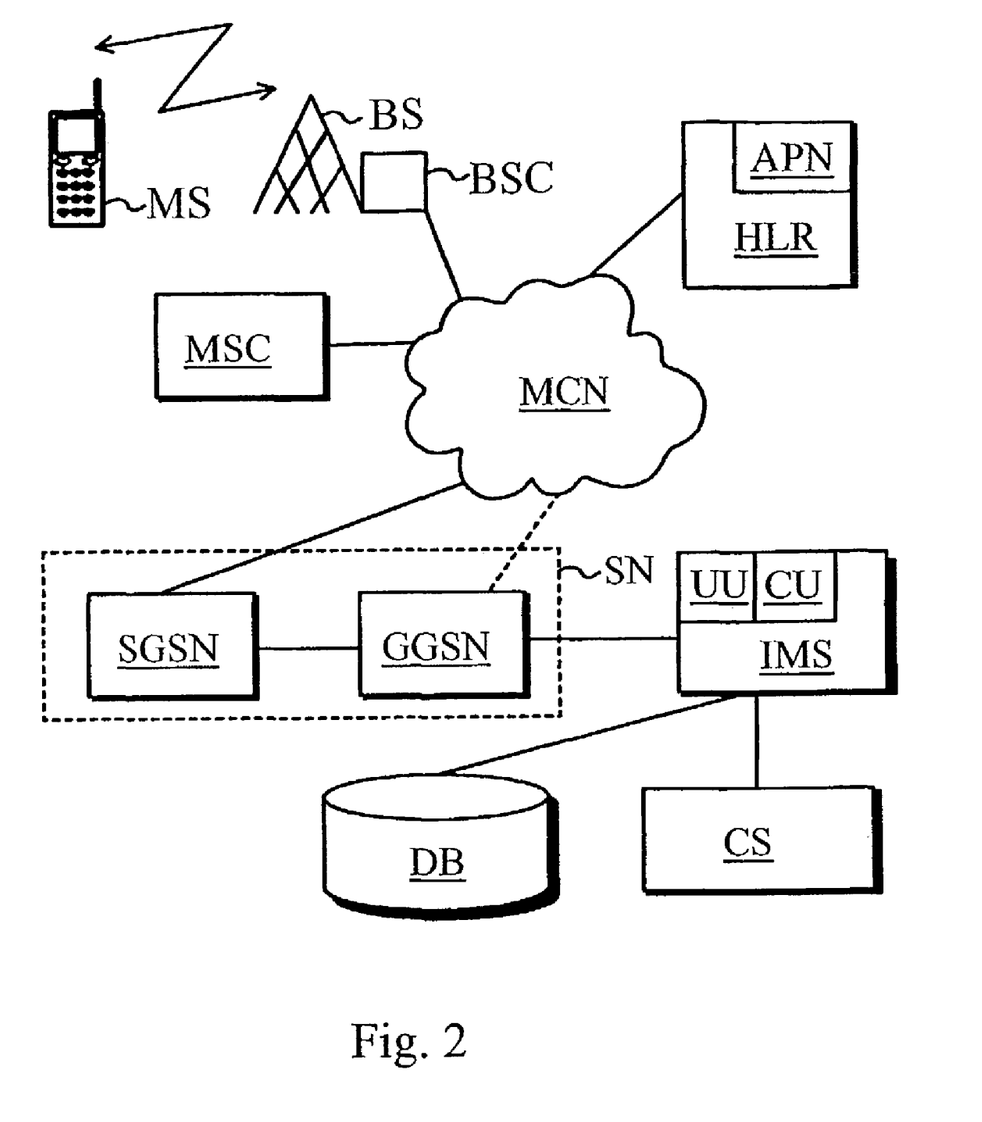
FIG. 2 is a block schematic diagram of a telecommunication system in accordance with the present invention.

A telecommunication system in accordance with the present invention is depicted in FIG. 2. A mobile communication network MCN may be implemented by the global system for mobile communication (GSM), which includes a general packet radio service (GPRS). The radio service comprises at least a service node SN formed of a serving GPRS support node SGSN and a gateway GPRS support node GGSN. A telecommunication connection is established from a mobile station MS, via a base station BS and base station controller BSC, to the mobile communication network MCN. A further telecommunication connection is established from the mobile communication network MCN to a content server CS that provides the subject service via a service node SN and a control server IMS. Information relating to use of the service is gathered to a database DB attached to control server IMS. The mobile communication network MCN additionally includes a mobile services switching center MSC and a home location register HLR. In one embodiment of the invention, an access point name definition APN is stored or maintained in the home location register HLR; in another embodiment, a control unit CU and an update unit UU of the database DB are located in the control server.

Figure 3:
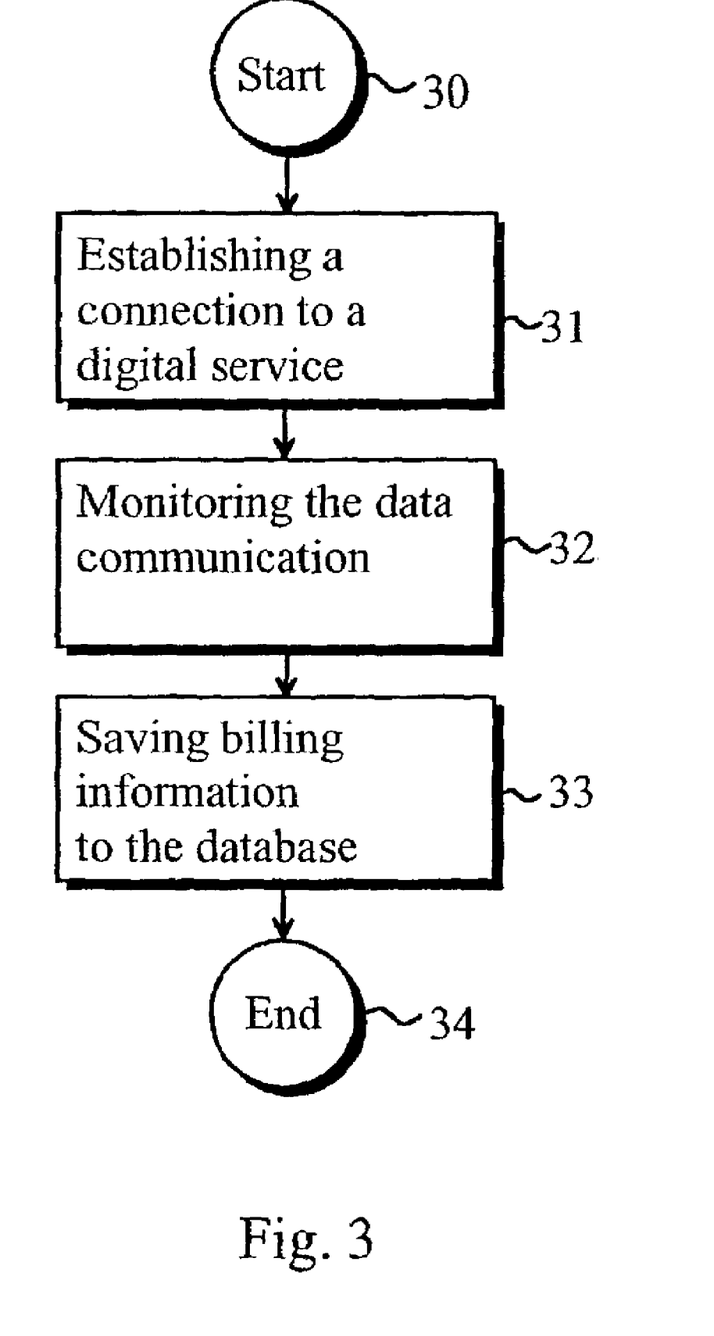
FIG. 3 is a flow chart of a method for gathering billing information in accordance with the invention.

The flow chart of FIG. 3 depicts one method in accordance with the invention for gathering billing information into the database DB. A connection to the digital service, which is generally located in the content server CS, is first established from the mobile station MS (block 31). The data and communications to be transferred by way of the established connection is then monitored using the control server IMS (block 32). Billing information relating to the monitored data communications, such for example as the connection time and the amount of data transferred using the connection, is saved to the database DB (block 33).

Figure 4:
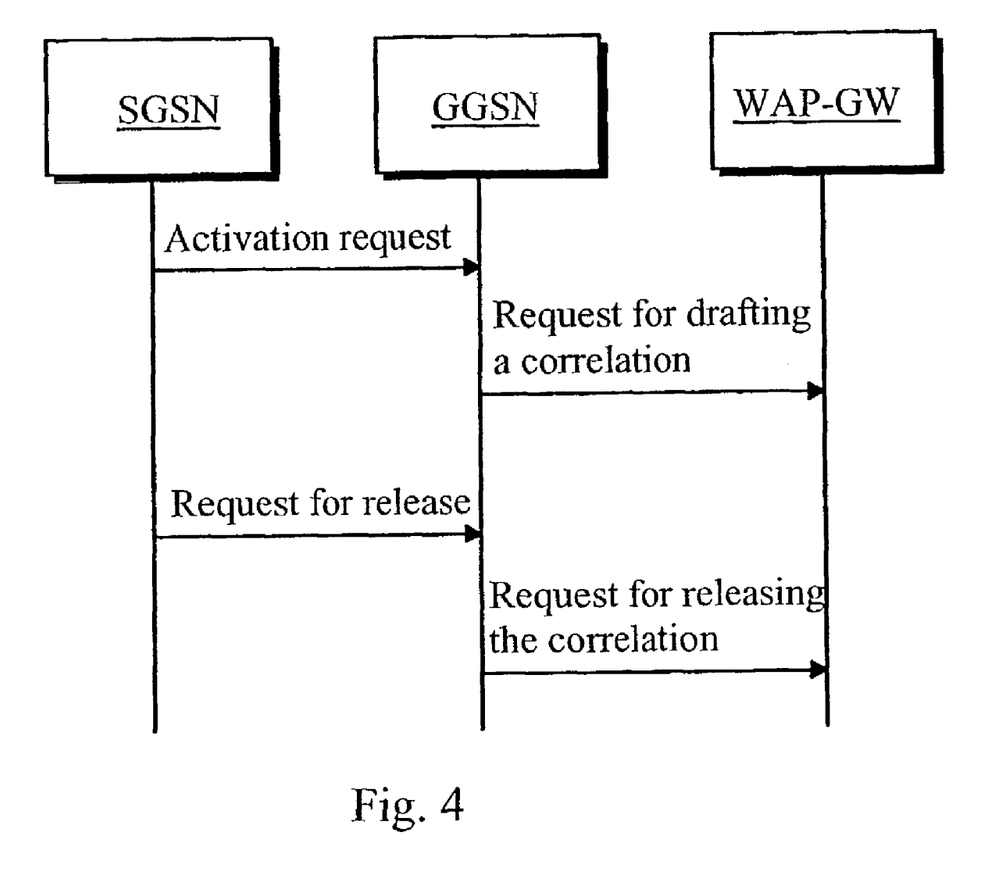
FIG. 4 is a signaling diagram of a method for setting up and releasing a service connection in accordance with the invention.

In the illustrative signaling diagram of FIG. 4, a connection from the serving GPRS support node SGSN to a wireless application protocol gateway node WAP-GW via the gateway GPRS support node GGSN is established and subsequently released. The connection is activated by sending an activation request from the serving GPRS support node SGSN to the wireless application protocol gateway node WAP-GW via the gateway GPRS support node GGSN. After use of the service has been completed, the connection is released by sending a request for setdown from the serving GPRS support node SGSN to the wireless application protocol gateway node WAP-GW via the gateway GPRS support node GGSN. FIG. 4 also depicts the drafting of a correlation between the Internet IP address and the subscriber number MSISDN or IMSI. The subscriber databases typically function on the basis of the MSISDN or IMSI subscriber number. A correlation between the IP address and the MSISDN or IMSI subscriber number is needed because the gateway node of the wireless application protocol WAP-GW sees only the IP user's address in the packets that it receives and not the subscriber number MSISDN or IMSI.

Figure 5:
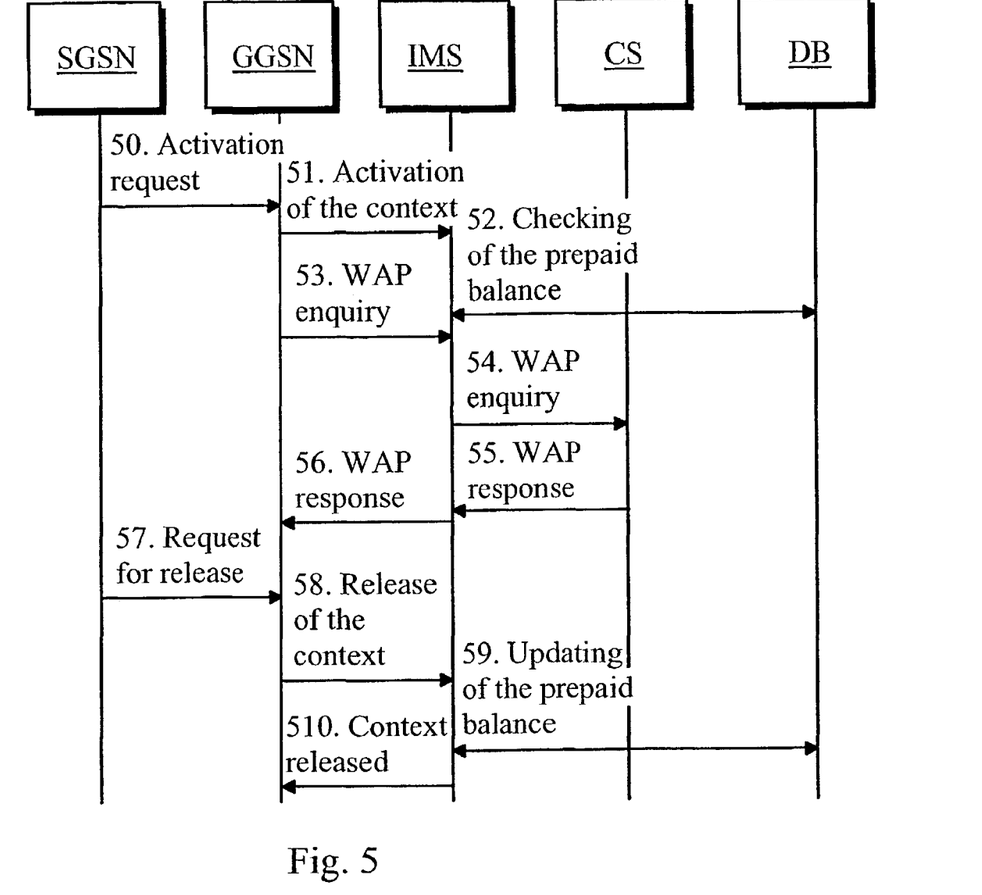
FIG. 5 is a signaling diagram of a method for implementing an access right to a prepaid service in accordance with the invention.

The signaling diagram of FIG. 5 represents, by way of example, one implementation of an access right to a prepaid service in accordance with the invention. As noted above, a connection from the serving GPRS support node SGSN to the content server CS via the control server IMS is established and subsequently released. The subscriber's prepaid or existing payment balance information is checked from the control server IMS and is updated in the database DB as and when necessary.

An activation request is first transmitted from the serving GPRS support node SGSN to the gateway GPRS support node GGSN, from which an activation of the context is sent to the control server IMS (blocks 50 and 51). The control server IMS checks the subscriber's current balance for use of the prepaid service in the database DB (block 52). Next, the gateway GPRS support node GGSN starts to transmit a WAP inquiry via the control server IMS to the content server CS if, according to the database DB, the subscriber can be granted access to the service (blocks 53 and 54). The content server CS then implements the digital service in accordance with the WAP inquiry and transmits a response to the inquiry (blocks 55 and 56). The connection is released or set down by sending a request for set-down from the serving GPRS support node SGSN to the content server CS via the gateway GPRS support node GGSN and control server IMS (blocks 57 and 58). In response to the request for set-down, the content server CS sends a message to the database DB to update the subscriber's prepaid balance and sends a message to the gateway GPRS support node GGSN to release the context (blocks 59 and 510). The billing may be implemented either on a transaction basis or by debiting the account based on time. FIG. 5, by way of example, utilizes time-based debiting of the subscriber's account balance.

When the context is activated, the subscriber MSISDN/IMSI information may be transmitted to the application protocol gateway node WAP-GW, as for example via a radius protocol. Notification of release of the context may correspondingly be transmitted using the radius protocol. In one embodiment of the invention, the radius protocol can be employed to determine, from the gateway GPRS support node GGSN, when a prepaid type of context is activated and when it is released. The control server IMS receives the information using the radius protocol and assures that the prepaid database DB is updated.

Figure 6:
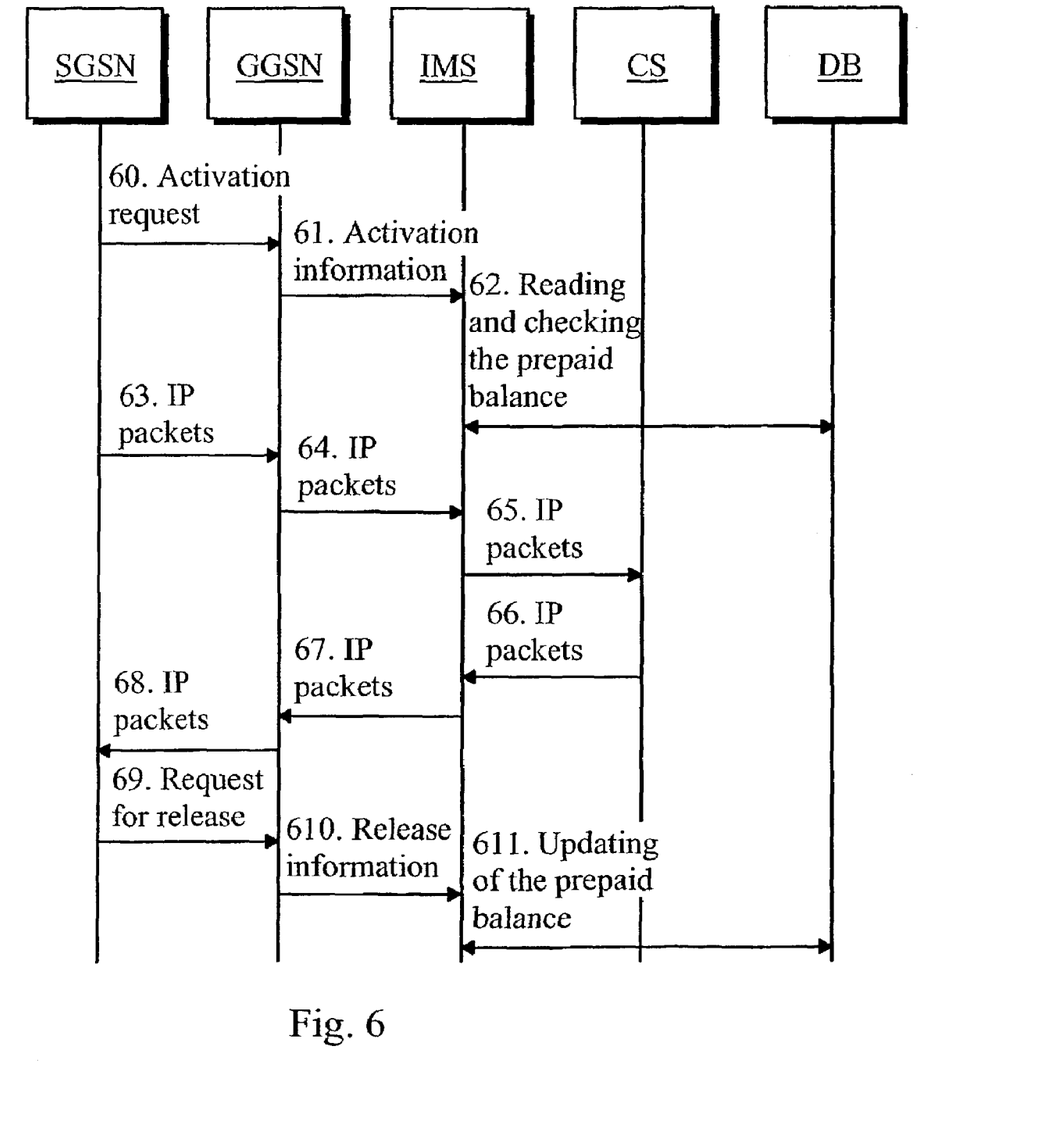
FIG. 6 is a signaling diagram of a method for implementing an Internet service in accordance with the invention.

The signaling diagram of FIG. 6 depicts implementation of an Internet service in accordance with the invention in which a telecommunication connection is established between the serving GPRS support node SGSN and the content server CS. An activation request of connection is first sent via the gateway GPRS support node GGSN to the control server IMS, from which the subscriber's current prepaid balance in the billing database DB is checked (blocks 60, 61 and 62). If the subscriber is granted access to the service, then packets defined by the Internet protocol are sent between the serving GPRS support node SGSN, gateway GPRS support node GGSN, control server IMS, and content server CS (blocks 63–68). When use of the service is discontinued, a request for release is sent from the serving GPRS support node SGSN to the content server CS, after which the costs or charges resulting from the just-ended use of the service are deducted from the subscriber's remaining balance in the prepaid database DB (blocks 69, 610 and 611).

In the embodiment depicted in FIG. 6, the prepaid balance of the subscriber is actively updated during the connection. If in the course of the connection or the continuing provision of or access to the service it is determined that the subscriber's prepaid balance is running out or is otherwise insufficient to continue, then the control server IMS stops transmitting the IP packets or sends to the gateway GPRS support node GGSN a request to terminate the connection.

Also in the FIG. 6 embodiment the prepaid service has been integrated with the gateway GPRS support node GGSN. The gateway GPRS support node GGSN implements time-based billing based on the amount of information transferred. It is also within the contemplation of the invention to utilize, in the gateway GPRS support node GGSN, transaction-based billing where deemed appropriate or necessary or otherwise as a matter of design choice.

While there have been shown and described and pointed out fundamental novel features of the invention as applied to preferred embodiments thereof, it will be understood that various omissions and substitutions and changes in the form and details of the methods depicted and described and the devices illustrated, and in their operation, may be made by those skilled in the art without departing from the spirit of the invention. For example, it is expressly intended that all combinations of those elements and/or method steps which perform substantially the same function in substantially the same way to achieve the same result are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of implementing a prepaid service in a packet-switched mobile communication network in which information, requested in a data service activation request from a mobile station connected to the network, is delivered to the mobile station so long as a prepaid service balance associated with the mobile station remains at a sufficient level, comprising the steps of:
    defining an access point name definition that points to a gateway GPRS support node through which the prepaid service is useable by the mobile station, the access point name definition being contained in the data service activation request from the mobile station;
    monitoring, by a control server for so long as the data service remains active, traffic between the mobile station and a content server for the prepaid service after the data service activation request containing the access point name definition has been sent by the mobile station; and
    updating, in a billing database, the prepaid service balance level based on said traffic monitoring by the control server.

2. A method in accordance with claim 1, wherein the defined access point name definition is stored in a home location register of the network.

3. A method in accordance with claim 1 further comprising, prior to said traffic monitoring, the steps of: checking the level of the prepaid service balance in the billing database; and preventing use of the prepaid service by the mobile station if said checking of the prepaid service balance level determines that said level is insufficient for use of the prepaid service.

4. A method in accordance with claim 1 further comprising, during said traffic monitoring, the steps of: checking the level of the prepaid service balance in the billing database; and preventing use of the prepaid service by the mobile station if said checking of the prepaid service balance level determines that said level is insufficient for use of the prepaid service.

5. A method in accordance with claim 3, wherein said preventing comprises stopping transmission of packets to the mobile station.

6. A method in accordance with claim 4, wherein said preventing comprises stopping transmission of packets to the mobile station.

7. A method in accordance with claim 3, wherein said preventing comprises transmitting a message to the gateway GPRS support node.

8. A method in accordance with claim 4, wherein said preventing comprises transmitting a message to the gateway GPRS support node.

9. A method in accordance with claim 1, wherein the billing database is updated by attributing follow-up information based on an MSISDN subscriber number associated with the mobile station.

10. A method in accordance with claim 1, wherein the billing database is updated by attributing follow-up information based on an IMSI subscriber number associated with the mobile station.

11. A method in accordance with claim 1, wherein the connection of the mobile station to the network uses a wireless application protocol.

12. A method in accordance with claim 1, wherein real-time billing is implemented in the control server.

13. A method in accordance with claim 1, wherein transaction-based billing is implemented in the control server.

14. A method in accordance with claim 1, wherein time debiting-based billing is implemented in the control server.

15. A method in accordance with claim 1, wherein billing based on an amount of information transferred to the mobile station is implemented in the control server.

16. A method in accordance with claim 1, wherein the billing database is located in the control server.

17. A method in accordance with claim 1, wherein the network comprises an intelligent network and the billing database is located in an SDP node of the intelligent network.

18. A system for implementing a prepaid service in a packet-switched mobile communication network in which information, requested in a data service activation request from a mobile station connected to the network, is delivered to the mobile station so long as a prepaid service balance associated with the mobile station remains at a sufficient level, said system comprising:
    a service node connected to the network;
    a content server connected to the service node;
    a control server connected to the service node; a billing database connected to the control server for storing billing information comprising the prepaid service balance;

an access point attribute that points to the service node and via which the prepaid service is usable by the mobile station;
a control unit for monitoring data communications between the mobile station and the prepaid service and for checking the prepaid service balance level in the billing database; and
an update unit for updating the prepaid balance level for the mobile station in the billing database based on use of the prepaid service.

19. A system in accordance with claim 18, further comprising barring facilities for preventing use of the prepaid service by the mobile station.

20. A system in accordance with claim 18, wherein the packet-switched mobile communication network comprises a general packet radio service.

21. A system in accordance with claim 18, wherein the packet-switched mobile communication network comprises a global system for mobile communication.

22. A system in accordance with claim 18, wherein the service node comprises a gateway GPRS support node and a serving GPRS support node.

23. A system in accordance with claim 22, wherein the control server is integrated with the gateway GPRS support node.

24. A method, comprising:
requesting information in a data service activation request from a mobile station coupled to the network;
delivering the information to the mobile station based at least in part upon a determination that a prepaid service balance associated with the mobile station remains at a sufficient level;
defining an access point name definition that points to a gateway packet switched type support node through which the prepaid service is capable of being useable by the mobile station, the data service activation request from the mobile station comprising the access point name definition;
monitoring, by a control server based at least in part upon a determination that the data service remaining active, traffic between the mobile station and a content server for the prepaid service after the data service activation request comprising the access point name definition has been sent by the mobile station; and
updating, in a billing database, the prepaid service balance level based at least in part upon said traffic monitoring by the control server.

25. A method in accordance with claim 24, wherein the defined access point name definition is capable of being stored in a home location register.

26. A method in accordance with claim 24, further comprising, prior to said traffic monitoring, checking the level of the prepaid service balance in the billing database; and preventing use of the prepaid service by the mobile station if said checking of the prepaid service balance level determines that said level is insufficient for use of the prepaid service.

27. A method in accordance with claim 24, further comprising, during said traffic monitoring, checking the level of the prepaid service balance in the billing database; and preventing use of the prepaid service by the mobile station if said checking of the prepaid service balance level determines that said level is insufficient for use of the prepaid service.

28. A method in accordance with claim 26, wherein said preventing comprises stopping transmission of packets to the mobile station.

29. A method in accordance with claim 27, wherein said preventing comprises stopping transmission of packets to the mobile station.

30. A method in accordance with claim 26, wherein said preventing comprises transmitting a message to the gateway packet switched type support node.

31. A method in accordance with claim 27, wherein said preventing comprises transmitting a message to the gateway packet switched type support node.

32. A method in accordance with claim 24, wherein the billing database is updated at least in part by attributing follow-up information based at least in part on a Mobile Station International Subscriber Directory Number subscriber number associated with the mobile station.

33. A method in accordance with claim 24, wherein the billing database is updated at least in part by attributing follow-up information based at least in part on an International Mobile Subscriber Identity subscriber number associated with the mobile station.

34. A method in accordance with claim 24, wherein the coupling of the mobile station to the network at least partly utilizes a wireless application protocol.

35. A method in accordance with claim 24, wherein real-time billing is capable of being implemented at least in part in the control server.

36. A method in accordance with claim 24, wherein transaction-based billing is capable of being implemented at least in part in the control server.

37. A method in accordance with claim 24, wherein time debiting-based billing is capable of being implemented at least in part in the control server.

38. A method in accordance with claim 24, wherein said updating further comprses, billing based at least in part on an amount of information transferred to the mobile station is capable of being implemented at least in part in the control server.

39. A method in accordance with claim 24, wherein the billing database is capable of being located at least in part in the control server.

40. A method in accordance with claim 24, wherein the network comprises an intelligent network and the billing database is capable of being located at least in part in an Semidefinite Programming node of the intelligent network.

41. A system, comprising:
means for requesting information in a data service activation request from a mobile station on coupled to the network;
means for delivering the information to the mobile station based at least in part upon a determination that a prepaid service balance associated with the mobile station remains at a sufficient level;
means for defining an access point name definition that points to a gateway packet switched type support node through which the prepaid service is capable of being useable by the mobile station, the data service activation request from the mobile station comprising the access point name definition;
means for monitoring, by a control server based at least in part upon a determination that the data service remaining active, traffic between the mobile station and a content server for the prepaid service after the data service activation request comprising the access point name definition has been sent by the mobile station; and means for updating, in a billing database, the prepaid service balance level based at least in part upon said traffic monitoring by the control server.

42. A system in accordance with claim 41, further comprising, prior to said traffic monitoring, means for checking the level of the prepaid service balance in the billing database; and means for preventing use of the prepaid service by the mobile station if said checking of the prepaid service balance level determines that said level is insufficient for use of the prepaid service.

43. A system in accordance with claim 41, further comprising, during said traffic monitoring, means for checking the level of the prepaid service balance in the billing database; and means for preventing use of the prepaid service by the mobile station if said checking of the prepaid service balance level determines that said level is insufficient for use of the prepaid service.

* * * * *

UNITED STATES PATENT AND TRADEMARK OFFICE
CERTIFICATE OF CORRECTION

PATENT NO. : 7,133,393 B2  Page 1 of 1
APPLICATION NO. : 10/361289
DATED : November 7, 2006
INVENTOR(S) : Sami Ala-Luukko It is certified that error appears in the above-identified patent and that said Letters Patent is hereby corrected as shown below:

Column 10, Claim 38, line 2 "comprses" should be changed to --comprises--

Column 10, Claim 41, line 3, "request from a mobile station on coupled" should be changed to --request from a mobile station coupled--

Signed and Sealed this

Sixteenth Day of October, 2007

JON W. DUDAS
*Director of the United States Patent and Trademark Office*